United States Patent [19]
Seyferth et al.

[11] Patent Number: 4,780,337
[45] Date of Patent: Oct. 25, 1988

[54] HYBRID POLYMERS DERIVED FROM SI-H CONTAINING ORGANOSILICON POLYMERS AND UNSATURATED METAL ALKOXIDES

[75] Inventors: Dietmar Seyferth, Lexington, Mass.; Tom Targos, New Haven, Conn.

[73] Assignee: Massachusetts Institute of Technology, Cambridge, Mass.

[21] Appl. No.: 947,026

[22] Filed: Dec. 29, 1986

[51] Int. Cl.$^4$ .............................................. B32B 9/00
[52] U.S. Cl. ...................................... 427/387; 522/60; 522/62; 522/140; 522/141; 522/148; 522/172; 525/478; 525/479; 528/15; 528/31; 528/24; 528/32; 528/21; 528/30; 428/447
[58] Field of Search ....................... 528/15, 31, 32, 24, 528/21, 30; 522/140, 141, 60, 62, 148, 172; 525/478, 479; 427/387; 428/447

[56] References Cited

U.S. PATENT DOCUMENTS

| | | | |
|---|---|---|---|
| 4,543,398 | 9/1985 | Bany et al. | 528/32 |
| 4,611,035 | 9/1986 | Brown-Wensley et al. | 528/25 |
| 4,645,807 | 2/1987 | Seyferth et al. | 525/474 |
| 4,650,837 | 3/1987 | Seyferth et al. | 525/478 |

OTHER PUBLICATIONS

Hawley, Condensed Chemical Dictionary, Van Nostrand Reinhold Company, N.Y., 10th ed., p. 741.
Encyclopedia of Science and Technology, McGraw-Hill Book Co., N.Y., 5th ed. pp. 46–47, 1982.
Aitken C. et al., J. Organomet Chem. 279:11–13 (1985).
D. C. Bradley et al., J. Chem. Soc. (1952) 2027.

*Primary Examiner*—Melvyn I. Marquis
*Attorney, Agent, or Firm*—George W. Neuner; Ronald I. Eisenstein

[57] ABSTRACT

A method of protecting carbon/carbon composites against oxidation at high temperatures is disclosed. This comprises coating the composite with a hybrid metal alkoxide/organosilicon polymer. The hybrid polymer is prepared by a method comprising mixing an organosilicon polymer having a plurality of Si-H functional groups with a sufficient quantity to undergo a hydrosilylation reaction of a metal alkenoxide, wherein the metal alkenoxide comprises a metal, metalloid or silicon alkoxide containing at least one alkenoxy group; and initiating the hydrosilylation reaction to form the hybrid polymer.

27 Claims, No Drawings

HYBRID POLYMERS DERIVED FROM SI-H CONTAINING ORGANOSILICON POLYMERS AND UNSATURATED METAL ALKOXIDES

The Government has rights in this invention pursuant to Grant Number AFOSR-85-0265 awarded by the Department of the Air Force.

BACKGROUND

Carbon/carbon composites are important structural ceramics. They have useful properties such as superior strength and high thermal stability. However, they have very poor oxidative stability at higher temperatures, and this limits their use. It would be extremely desirable if these carbon/carbon composites could be protected against such oxidation because a much broader utility would result.

SUMMARY OF THE INVENTION

We have now discovered that a hybrid polymer can be used to coat carbon/carbon composites and thus protect the composites against oxidation at high temperatures. This hybrid polymer is prepared by mixing an organosilicon polymer having a plurality of Si—H functional groups with a sufficient quantity of a M-alkenoxide to undergo a hydrosilylation reaction and initiating the reaction. As used herein the M-alkenoxide comprises a metal, metalloid or silicon atom bonded to at least one alkenoxy ligand. Preferably, the alkenoxy ligand is bound to a transition metal. More preferably, the alkenoxy ligand is bound to Cr, Hf, Mo, Nb, Ta, Ti, V, W or Zr. Preferably, the metal alkenoxide is represented by the formula $M(OR^1)_m$ or $(R^1O)_3M\equiv M(OR^1)_3$ where $R^1$ is a substituted or unsubstituted alkenyl group having 2 to about 10 carbon atoms, M is a metal, metalloid or silicon atom and m is an integer from 1 to 6. The organosilicon polymer is preferably an organic polysilane having a plurality of Si—H functional groups, and is more preferably (a) an organopolysilane having a plurality of repeat units of the formula $$[(RSiH)_x(RSi)_y]_n \qquad (I),$$

(b) a polycarbosilane having a plurality of repeat units of the formula $$[RSi(H)(Org)_q]_n \qquad (II),$$

or (c) a polysiloxane having a plurality of repeat units of the formula $$[RSi(H)O]_n \qquad (III)$$

where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms. Org is a difunctional alkylene, alkenylene or alkynylene group, q is 1 or greater, $x+y=1$, and n is an integer greater than 1.

Additionally, the Si—H containing organosilicon polymer can include polymers having a plurality of repeat units of the formula $$\begin{array}{c} R \\ | \\ -\!\!\!\!(\!\mathrm{Si}\!-\!\mathrm{N}\!)_{\!n}, \\ | \quad | \\ H \quad H \end{array} \qquad (IV)$$

$$\begin{array}{c} R \\ | \\ -\!\!\!\!(\!\mathrm{Si}\!-\!\mathrm{N}\!)_{\!n}, \\ | \quad | \\ H \quad R \end{array} \qquad (V)$$

$$\begin{array}{c} H \\ | \\ -\!\!\!\!(\!\mathrm{Si}\!-\!\mathrm{N}\!)_{\!n} \text{ and} \\ | \quad | \\ H \quad R \end{array} \qquad (VI)$$

$$\begin{array}{c} R \\ | \\ -\!\!\!\!(\!\mathrm{Si}\!-\!\mathrm{A}\!-\!\mathrm{Org}\!-\!\mathrm{B}\!)_{\!n} \\ | \\ H \end{array} \qquad (VII)$$

where R and Org are the same as defined above, $A=B=O$, $A=B=NH$, NR and $A=O$ and $B=NH$.

DETAILED DESCRIPTION OF THE INVENTION

We have now discovered a method to protect carbon/carbon composites against oxidation at high temperatures. This process comprises coating the surface of the carbon/carbon composite and infiltrating the pores with a hybrid metal alkenoxide/organosilicon polymer. The hybrid polymer is formed by reacting a sufficient quantity of a Si—H containing organosilicon polymer with an unsaturated metal alkoxide (also referred to as a metal alkenoxide or M-alkenoxide) to undergo a hydrosilylation reaction.

The Si—H containing organosilicon polymer is preferably an organic polysilane having a plurality of Si—H functional units. More preferably the organic polysilane is (a) an organopolysilane containing a plurality of repeat units of the formula:

$$[(RSiH)_x(RSi)_y]_n \qquad (I),$$

(b) a polycarbosilane containing a plurality of repeat units of the formula:

$$[RSi(H)(Org)_q]_n \qquad (II),$$

or (c) a polysiloxane containing a plurality of repeat units of the formula:

$$[RSi(H)O]_n \qquad (III)$$

where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms, Org is a difunctional alkylene, alkenylene or alkynylene group, q is 1 or greater, $x+y=1$, and n is an integer greater than 1.

Preferably R is H or a lower alkyl group. More preferably R is $CH_3$.

Additionally, the Si—H containing organosilicon polymer can include polymers having a plurality of repeat units of the formula

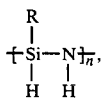 (IV)

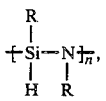 (V)

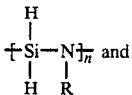 (VI)

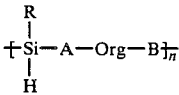 (VII)

where R and Org are the same as defined above, A=B=O, A=B=NH, NR and A=O and B=NH. The Si—H containing polymer can also preferably contain a plurality of a mixture of repeat units. For example, [RSi(H)O]$_n$ and [(R'SiH)$_x$(R'Si)$_y$)]$_n$, where R' and n' are defined the same as R or n and may be the same or different.

Preferably, the organopolysilane, the polycarbosilane and the polysiloxane contain at least about 25 mole % of the repeat units of formula I, II and III, respectively. More preferably, the organopolysilane, the polycarbosilane and the polysiloxane contain at least about 35 mole % of the repeat units of formula I, II and III, respectively. Most preferably, the organopolysilane, the polycarbosilane and the polysiloxane contain at least about 50 mole % of repeat units of the formula I, II or III respectively.

In one preferred embodiment where the Si—H containing polymer is an organopolysilane, y=0 and x=1, where [(RSiH)$_x$]$_n$ may be linear, a mixture of cyclics, or a hybrid of both types. For example, the organopolysilane can be poly(phenylsilane), [PhSiH]$_n$ (Ph is a phenyl group), cf, Aitken, C. et al, *J. Organomet. Chem.*, 279: 11–13 (1985).

The term unsaturated metal alkoxide or metal alkenoxide or M-alkenoxide as used herein refers to a metal, metalloid or silicon atom bonded to at least one alkenoxy ligand. The alkoxide more preferably contains two unsaturated groups, although it can contain more than two alkenoxy groups. The alkenoxy ligand is preferably bonded to M where M is an atom selected from Al, As, B, Be, Bi, Cd, Ce, Co, Cr, Cu, Dy, Er, Eu, Fe, Ga, Gd, Ge, Hf, Ho, In, La, Mn, Mo, Nb, Nd, Pb, Pr, Sb, Si, Sc, Sm, Sn, Ta, Tb, Th, Ti, Tl, Tm, U, V, W, Y, Yb, Zn or Zr. More preferably, the ligand is complexed with a transition metal. Still more preferably the ligand is complexed with Cr, Hf, Mo, Nb, Ta, Ti, V, W or Zr. Most preferably the ligand is complexed with Hf and Zr.

For example, in the preparatio of a hafnium containing coating material, the first step of the preparation could be the synthesis of a suitable hafnium alkoxide of *average* composition HF(OCHMe$_2$)$_2$(OCH$_2$CH=CH$_2$)$_2$ [where Me is methyl] by the reaction of a suspension of HfCl$_4$ (x moles) in benzene with a mixture of 2x moles each of Me$_2$CHOH and CH$_2$=CHCH$_2$OH. Ammonia then is bubbled into the resulting clear reaction solution. The chemistry involved in described by eq. 1.

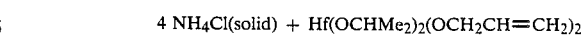

The metal alkoxide formula is an average composition since the rates of reaction of the two alcohols are different. A better representation would be the formula Hf(OCHMe$_2$)$_m$(OCH$_2$CH=CH$_2$)$_{4-m}$, with molecules with m=0, 1, 2, 3, 4 contributing to the product alkoxide.

A more designed synthesis also can be carried out, i.e., first preparation (e.g., in the case of M=Ti) of (iPrO)$_2$TiCl$_2$ as a pure compound and then reaction of the latter with 2CH$_2$=CHCH$_2$OM or 2CH$_2$=CHOLi (M=Li, Na or K) to give specifically (iPrO)$_2$Ti(OCH$_2$CH=CH$_2$)$_2$ or (iPrO)$_2$Ti(OCH=CH$_2$)$_2$.

The Hf alkoxide which contains the unsaturated group, for example, the C=C bonds, then is reacted with an Si—H containing organosilicon polymer, for instance, the polysiloxane, [CH$_3$Si(H)O]$_n$ (Petrarch Systems PS-122, molecular weight reported by vendor in the n=75–85 range) in an organic solvent such as toluene at reflux in the presence of a catalyst, for example H$_2$PtCl$_6$.6H$_2$O. The Si—H containing polymer undergoes a hydrosilylation reaction with the metal alkenoxide. After the reaction is complete, the solution is concentrated to about ¼ of the original volume and the resulting solution (clear, oily lacquer) is used in coating experiments as described in the experimental section. The reaction product is of "average" composition, 1, but can be more

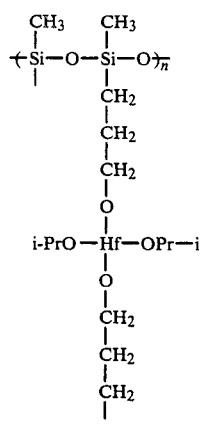

1

(with the "free" bonds shown connected either within the polymer chain or connecting (cross-linking) different polymer chains) complicated because a mixture of Hf(OCHMe$_2$)$_n$(OCH$_2$CH=CH$_2$)$_{4-n}$ molecules can be involved. Some cross-linking will occur as indicated since a Hf alkoxide molecule with two or more allyloxy substituents can react with two different siloxane polymer molecules. However, the product is soluble in an organic solvent such as toluene. C/C composite oxidation experiments showed that this Hf-containing coating results in a significant (6-fold minimum) increase in stability toward oxidation at elevated temperatures.

The chemistry described above can be applied to the alkoxides of wide variety of metals as noted above. Preferably the metal, M, is Cr, Hf, Mo, Nb, Ta, Ti, V, W and Zr since these give very thermally stable, hard metal carbides.

Alkoxide stoichiometry can be represented as indicated in the following representative examples where $R^1$ is a substituted or unsubstituted alkenyl group having 2 to about 10 carbon atoms:
$MOR^1$ where M is Tl,
$M(OR^1)_2$ where M is Cu, Eu, Gd, Pb and Sn.
$M(OR^1)_3$ where M is Al, As, B, Bi, Ce, Dy, Er, Ga, Ho, In, La, Lu, Nd, P, Pr, Sb, Sc, Sm, Tb, Tm, Y, and Yb.
$M(OR^1)_4$ where M is Ge, Hf, Si, Sn, Th, Ti, U and Zr.
$M(OR^1)_5$ where M is Nb, Ta and V,
$M(OR^1)_6$ where M is Mo and W, and U
$(R^1O)_3M\equiv M(OR^1)_3$ where M is Mo and W.

The presence of at least one alkenoxy ligand on the metal is essential to the success of this procedure. The alkenoxy substituent preferably uses an allyloxy group in view of the ready availability of allyl alcohol. Substituted allyloxy groups may be used such as $CH_2=CHCHRO$, $CH_2=CHCR_2O$ and $RCH=CHCH_2O$, as well as propargyloxy, $HC\equiv CCH_2O$, and substituted propargyloxy groups, butenyloxy groups, $CH_2=CHCH_2CH_2O$, and the like. A vinyloxy, $CH_2=CHO$, group may be substituted on the metal via $CH_2=CHOLi$ (from the reaction of n-butyllithium with tetrahydrofuran).

The weight ratio of Si—H containing organosilicon polymer:unsaturated metal alkoxide can vary widely and is readily determined empirically by the skilled artisan based upon the present disclosure and the desired product. Typically, the weight ratio of Si—H containing organosilicon polymer:unsaturated metal alkoxide will range from about 15:1 to about 1:10. More preferably, it will range from about 10:1 to about 1:1. The mole ratio of Si—H moiety to unsaturated moiety can also vary widely. Preferably, the mole ratio of Si—H moiety:unsaturated moiety will range from about 35:1 to about 1:30; more preferably the ratio will range from about 30:1 to about 1:1.

The Si—H containing organosilicon polymer and unsaturated metal alkoxide can be reacted in any organic solvent in which each material is soluble. These solvents are well known to the person of ordinary skill in the art and include toluene, tetrahydrofuran (THF) and benzene.

The hydrosilylation reaction can be initiated by any of a variety of means well known to the skilled artisan. Preferably the reaction is catalyzed by use of any of a wide variety of transition metal catalysts using transition metal complexes well known in the art such as those of Pt, Pd, Rh, Ru, Ir, Co, Fe, etc., for example $H_2PtCl_6.6H_2O$, or by a free radical catalyst. The free radical initiator is either a peroxide, more preferably an organic peroxide, or an azo compound, preferably azobisisobutyronitrile and the like. These free radical catalysts are well known in the art. The reaction can be initiated by UV-irradiation in the presence or absence of a free radical catalyst or by means of some other energy input such as heat or γ-irradiation.

After the hybrid polymer is formed it is then applied to the carbon/carbon composite by any of a variety of well known methods to provide the composite with protection against oxidation at high temperatures.

For example, after rinsing the carbon/carbon composite the composite can be placed into a flask under an inert atmosphere such as Ar or $N_2$, the hybrid polymer coating solution is then added by syringe, and the composite is then soaked in the solution under a vacuum. This procedure is preferably repeated 2 to 4 times to result in the coating and/or impregnation of the composite with the hybrid polymer.

The coated composite is pyrolyzed in an inert gas atmosphere for a sufficient time and at a sufficient temperature to form a ceramic coating.

The invention is further illustrated by the examples that follow:

EXPERIMENTAL

I. Preparation of Reactants

A. Preparation of "$M(OCHMe_2)_2(OCH_2CH=CH_2)_2$" (M=Hf, Zr) (Based on the method of D. C. Bradley, R. C. Mehrotra and W. Wardlaw, *J. Chem. Soc.* (1952) 2027)

1. M=Hf

In a dry box, a 250 ml round-bottomed flask equipped with a stir-bar, a gas inlet tube, an addition funnel and a serum cap was charged with 10.1 g (31.5 mmol) of $HfCl_4$. Benzene (150 ml) was added by syringe to suspend the $HfCl_4$. By means of the addition funnel a mixture of a 3.88 g (64.6 mmol) of isopropanol and 3.75 g (64.6 mmol) of allyl alcohol in 10 ml of benzene was added to the cold (ice bath) $HfCl_4$ suspension, slowly over a period of 15 minutes. The reaction solution became clear during the course of the addition. After the addition had been completed, gaseous ammonia was bubbled into the reaction mixture for 1 hour. The resulting white precipitate of $NH_4Cl$ was filtered (under nitrogen) and the filtrate was evaporated at reduced pressure (trap-to-trap distillation) to remove the solvent. The residue, 10.2 g (24.6 mmol [78%], based on the "$Hf(OCHMe_2)_2(OCH_2CH=CH_2)_2$" formulation) was a glassy, viscous paste and was soluble in hexane, toluence and THF.

$^1$H NMR (90 MHz, $C_6D_6$): δ 6.16, 5.51, 5.15, 4.79 (br. multiplets OC$\underline{H}$(CH$_3$)$_2$ and OC$\underline{H}_2$C$\underline{H}=C\underline{H}_2$, 12H), 1.34, 1.28, (OCH(C$\underline{H}_3$)$_2$, 12H).

IR (KBr, neat smear on plates): 3410w, 3360w, 3200m, 3080s, 3015sh, 2968s, 2937s, 2858s, 2785m, 2700m, 2633m, 1842m, br; 1674m, 1645m, 1615w, 1466s, 1454s, 1421s, 1379s, 1365s, 1342s, 1288m, 1265m, 1170–1130s, 1020s, 915s, 846m, 827sh, 770m.

Analysis for $HfO_4C_{12}H_{24}$, % calculated: C, 35.20; H, 5.84. % found: C, 32.28; H, 5.46.

2. M=Zr

The same procedure was used in a reaction of 10.2 g (43.5 mmol) of $ZrCl_4$, 5.23 g (87.1 mmol) of $Me_2CHOH$ and 5.06 g (87.1 mmol) of $CH_2=CHCH_2OH$ in 40 ml of benzene, with subsequent $NH_3$ treatment. The final residue (12.95 g, 92% yield on the basis of "$Zr(OCHMe_2)_2(OCH_2CH=CH_2)_2$" was soluble in hexane, toluene and THF.

$^1$H NMR (90 MHz, $C_6D_6$): δ 6.24, 5.51, 5.16, 4.80 (br. multiplets, OC$\underline{H}$(CH$_3$)$_2$, and OC$\underline{H}_2$C$\underline{H}=C\underline{H}_2$, 12H) 1.34, 1.28, (OCH(C$\underline{H}_3$)$_2$, 12H).

IR (KBr, neat smear on plates): 3210w, 3085m, 3015sh, 2975s, 2935s, 2855s, 2780w, 2690w, 2630w, 1840w, 1672m, 1647m, 1575w, 1470–1465m, 1425m, 1380s, 1365s, 1340s, 1290m, 1264m, 1175–1220s, 1020s, 915s, 850m, 755w.

Analysis for $ZrO_4C_{12}H_{24}$; % calculated: C, 44.58; H, 7.42. % found: C, 41.86; H, 7.13.

B. Preparation of Diisopropoxydivinyloxytitanium

Diisopropoxytitanium dichloride (0.262 g, 1.10 mmol) was dissolved in 20 ml of THF (dry, nitrogen atmosphere) in a 100 ml Schlenk flask. This solution was cooled to −78° C. at which point the lithium enolate of acetaldehyde, $CH_2=CHOLi$, in THF solution (2.20 mmol) was added to the stirred solution via syringe. This solution was allowed to warm to room temperature. After two hours of stirring, the solvent was evaporated by trap-to-trap distillation, leaving a yellow solid. This solid was extracted with pentane yielding a yellow pentane-soluble solid (crude yield 0.19 g, 70%). $^1H$ NRM $(CDCl_3)$ δ 1.19 (d, J=6.4 Hz, 6.7H, C$\underline{H}$—$(CH_3)_2$), 3.10 (d, J=28 Hz, 1H, OC$\underline{H}$=$CH_2$), 3.62 (s, 1H, $\overline{O}CH=CH_2$), 4.00 (sept, J=6.45 $\overline{Hz}$, 1H, C$\underline{H}$—$(CH_3)_2$), 6.55 (d, J=10.3 Hz, 1H, OC$\underline{H}$=$CH_2$), 7.01 (d, J=19.7, 1H, OC$\underline{H}$=$CH_2$).

C. Preparation of Si—H Containing Organosilicon Polymer

1. Organopolysilane

The preparation of $[(CH_3SiH)_x(CH_3Si)_y]_n$ (liquid polymer, x is 0.85, y is 0.15) has been described previously in U.S. patent application Ser. No. 756,353, filed July 18, 1985, now U.S. Pat. No. 4,645,807, which is incorporated herein by reference.

2. Polycarbosilane

The preparation of some polycarbosilanes is described in U.S. patent application Ser. No. 781,934, filed Sept. 30, 1985, now U.S. Pat. No. 4,650,837, which is incorporated herein by reference. This application also contains characterizing data for the commercial polycarbosilane (Yajima PCS), product of Nippon Carbon Co., sold in the U.S.A. by Dow Corning Corporation.

3. Polysiloxane

The preparation of cyclic polysiloxanes is described in U.S. patent application Ser. No. 849,390, filed Apr. 8, 1986, now U.S. Pat. No. 4,705,837, which is incorporated herein by reference. (The linear $[CH_3Si(H)O]_n$ polysiloxane (PS-122) was purchased from Petrarch).

II. Preparation of Metal Alkoxide-Substituted Polysiloxanes by Hydrosilylation In a typical procedure, a 100 ml 3-necked, round-bottomed flask equipped with a reflux condenser, septum and gas inlet tube was flame-dried and purged with nitrogen. It then was charged with the Si—H containing polymer and 25 ml of toluene. The mixture was stirred (magnetic stirring) until the polymer had dissolved. The catalyst, $H_2PtCl_6.6H_2O$ in isopropanol ($2\times10^{-5}$ ml), was added, followed by "M(OP$_{r-1}$)$_2$(OCH$_2$CH=CH$_2$)$_2$" (m=Zr and Hf) dissolved in 15 ml of toluene. The reaction mixture was stirred and heated at reflux for 5 hours, then was allowed to cool to room temperature. High vacuum trap-to-trap distillation was used to remove all volatiles, leaving the solid product which was kept at high vacuum overnight.

A. Organopolysilane, $[(CH_3SiH)_x(CH_3Si)_y]_n$

1. Hafnium alkoxide

Reaction as above using 1.1123 g of "Hf(OPr—i)$_2$(OCH$_2$CH=CH$_2$)$_2$" and 1.76 g of the polysilane (5:1 SiH/C$\underline{H}$=CH$_2$ ratio) gave a white, glassy solid in 87% yield, $\overline{MW}$ (cryoscopy in benzene) 1626, which was soluble in common organic solvents. The ceramic yield obtained on pyrolysis under argon to 1000° C. (TGA) was 86%. The proton NMR spectrum of the polymer ($C_6D_6$) showed resonances for $CH_3Si$ (δ 0.48), SiH (δ 3.84) and O-alkyl. The ceramic product was a shiny, black solid.

2. Zirconium Alkoxide

Reaction using 0.6775 g of "Zr(OPr—i)$_2$(OCH$_2$CH=CH$_2$)$_2$" and 1.88 g of polysilane (5:1 SiH/CH=CH$_2$ ratio) gave an organic-soluble, white, glassy solid in 94% yield, $\overline{MW}$ 1406. Ceramic yield on pyrolysis under argon to 1000° C.:84% (shiny black solid).

B. Polycarbosilane

1. Hafnium Alkoxide

Reaction using 1.4926 g of the Hf alkoxide and 2.2605 g of the polycarbosilane (Yajima PCS, purchased from Dow Corning) (5:1 SiH/CH=CH$_2$ ratio) gave an organic-soluble yellow, fluffy solid in 81% yield (proton NMR ($C_6D_6$) SiMe at δ 0.32, SiH at δ 4.70, alkyl at δ 0.9), $\overline{MS}$ 1008, ceramic yield on pyrolysis under argon to 1000° C.:81% (shiny black solid).

2. Zirconium Alkoxide

Reaction using 1.1090 g of the Zr alkoxide and 2.2590 g of the polycarbosilane (5:1 SiH/CH=CH$_2$ ratio) gave an organic-soluble, cream-colored, fluffy solid in 95% yield, $\overline{MW}$ 1027. Ceramic yield on pyrolysis under argon to 1000° C.:88% (shiny black solid).

C. Polysiloxane

1. Zirconium Alkoxide

Reaction as above of 0.5 g of "Zr(OPr—i)$_2$(OCH$_2$CH=CH$_2$)$_2$" and 2.00 g of Petrarch PS-122 $[CH_3Si(H)O]_x$ (10.8:1 SiH/CH=CH$_2$ ratio) gave an off-white, glassy, gummy solid which dissolved slowly in THF and benzene. The ceramic yield (black solid) obtained on pyrolysis under argon to 1000° C. (TGA) was 74%. $^1H$ NMR spectrum ($C_6D_6$): δ 5.14 (br, s, SiH), 1.42 (br, m) 0.53 (br, s, SiCH$_3$).

IR (KBr): 2950s, 2914s, 2852m, 2144s, 1450w, 1407w, 1371w, 1252s, 1135–1010s, 940s, 882–827s, 792s, 750s, cm$^{-1}$.

In another reaction, 0.80 g of "Zr(OPr—i)$_2$(OCH$_2$CH=CH$_2$)$_2$" and 1.60 g of PS-122 were used (SiH/CH=CH$_2$=5.4). The ceramic yield (black solid) on pyrolysis to 1000° C. was 81%. Pyrolysis of a sample of the off-white, glassy hydrosilylation product in a tube furnace to 1000° C. in a stream of air left a whitish-grey solid residue (78% yield).

2. Hafnium Alkoxide

Similar experiments were carried out with 3:1 and 4:1 ratios by weight of PS-122/"Hf(OPr—i)$_2$(OCH$_2$CH=CH$_2$)". In both cases, off-white glassy solids were produced. Their pyrolysis under argon to 1000° C. gave black solid residues in yields of 81% and 75%, respectively.

III. COATING EXPERIMENTS

A. Preparation of Coating Solutions

Under an inert atmosphere, a 100 ml three-necked, round-bottomed flask equipped with a stir-bar, reflux condenser and a serum cap was charged with a weighed amount of $[CH_3Si(H)O]_x$ (Petrarch Systems PS-122, x=75–85), chloroplatinic acid ($H_2PtCl_6.6H_2O$, 0.096M in isopropanol, $2\times10^{-5}$ ml) and toluene (30 ml). A weighed quantity of "Hf(OCHMe$_2$)$_2$(OCH$_2$CH=CH$_2$)$_2$" in 15 ml of toluene was added via cannula. (The weight of the reactants are given in Table I).

The clear reaction mixture was stirred and heated at reflux under nitrogen for 5 hours. After it had cooled to room temperature, it was concentrated to about ¼ of its original volume by trap-to-trap vacuum distillation of benzene. A clear, oily solution remained. It was stored under nitrogen (dry box).

A similar procedure was used to prepare coating solutions with "Zr(OCHMe$_2$)$_2$(OCH$_2$CH=CH$_2$)$_2$" (cf Table II).

B. Coating Procedures

Prior to coating, all carbon/carbon composites were rinsed thoroughly with hexane, dried in a 140° C. oven for 1 hour, allowed to cool, then weighed at room temperature. Pieces were then placed in a round-bottomed flask with a rubber septum, and were degassed under vacuum for 1 hour. (2-4 composite pieces were coated at each time, i.e., 2-4 pieces coated/batch). The evacuated flask containing the carbon/carbon composites was then brought into the inert atmosphere dry box and the coating solution was syringed into the flask. The pieces soaked in the solution under vacuum for 2-3 hours, after which time, nitrogen was introduced into the system. The composite pieces were removed from the coating solution with tongs and the excess coating solution drained off. The pieces were placed in a fused silica boat where the lacquer was allowed to set for 15-30 minutes. The boat containing these composite pieces was placed in a capped, N$_2$-filled tube and was transferred from the tube to an argon-filled, quartz tube furnace. In the tube furnace, the lacquered composite piece was heated at 200° C. under a continuous inert atmosphere (Ar) purge for 4 hours. Upon cooling, the boat and composite pieces were removed from the tube furnace and returned to the dry box. These composite pieces were then soaked in the coating solution for 1-2 hours, removed, and baked (200° C./Ar) for 2 hours two additonal times.

After the third *dip-coat-bake* cycle the coated pieces were weighed, and packed under N$_2$ in sample vials. Weight gain data for the polysiloxane-derived composite coatings are given in Tables III and IV.

TABLE I

Preparation of "Hf(OiPr)$_2$(OCH$_2$CH=CH$_2$)$_2$"/[CH$_3$Si(H)O]$_n$ Coating Mixtures

| Coating Solution No. | Wt. of Hf(OiPr)$_2$(OCH$_2$CH=CH$_2$)$_2$ (mmol) | mmol of —CH=CH$_2$ moiety | Wt. (g) of [CH$_3$Si(H)O]$_x$ | mmol of —Si—H moiety | Wt. ratio polysiloxane: Hf alkoxide | Ratio of mmol —Si—H:mmol —CH=CH$_2$ |
|---|---|---|---|---|---|---|
| TT-4-55 | 0.50 g [1.21] | 2.43 | 4.11 | 68.5 | 8:1 | 28:1 |
| TT-4-57 | 0.43 g [1.05] | 2.09 | 2.14 | 35.7 | 5:1 | 17:1 |
| TT-4-56 | 0.56 g [1.35] | 2.70 | 2.33 | 33.8 | 4:1 | 14:1 |
| TT-4-58 | 1.30 g [3.16] | 6.31 | 2.76 | 46.0 | 2:1 | 7.3:1 |
| TT-4-47 | 0.60 g [1.47] | 2.94 | 1.84 | 30.6 | 3:1 | 10.4:1 |
| TT-4-49 | 0.53 g [1.29] | 2.58 | 2.03 | 33.8 | 4:1 | 13:1 |

TABLE II

Preparation of "Zr(OiPr)$_2$(OCH$_2$CH=CH$_2$)$_2$"/(CH$_3$Si(H)O)$_n$ Coating Mixtures

| Coating Solution No. | Wt. of Zr(OiPr)$_2$—(OCH$_2$CH=CH$_2$)$_2$ (mmol) | mmol of —CH=CH$_2$ moiety | Wt. (g) of [CH$_3$Si(H)O]$_x$ | mmol of —Si—H moiety | Wt. ratio polysiloxane: Zr alkoxide | Ratio of mmol —SiH: mmol —CH=CH$_2$ |
|---|---|---|---|---|---|---|
| TT-4-61 | 0.44 g [1.67] | 2.73 | 3.54 | 59.0 | 8:1 | 22:1 |
| TT-4-60 | 0.54 g [1.67] | 3.35 | 2.19 | 36.5 | 4:1 | 11:1 |
| TT-4-59 | 1.10 g [3.40] | 6.80 | 2.25 | 37.5 | 2:1 | 5.5:1 |
| TT-4-68 | 0.50 g [1.56] | 3.11 | 2.00 | 33.4 | 4:1 | 10.8:1 |
| TT-4-69 | 0.80 g [2.48] | 4.95 | 1.60 | 26.70 | 2:1 | 5.4:1 |

TABLE III

Carbon/Carbon Composites Coated with "Hf(OiPr)$_2$(OCH$_2$CH=CH$_2$)$_2$"/[CH$_3$Si(H)O]$_n$ Reaction Mixtures

| Coating Solution No. | Wt. ratio of polysiloxane: Hf alkoxide | Batch No. | Composite wt. prior to coats (g) | Composite wt. after 3 coating runs (g) | Weight gain (mg) |
|---|---|---|---|---|---|
| TT-4-55 | 8:1 | 1 | 2.144 | 2.180 | 36 |
| | | 1 | 2.132 | 2.172 | 40 |
| | | 1 | 2.135 | 2.149 | 14 |
| | | 1 | 2.144 | 2.159 | 15 |
| | | 2 | 2.145 | 2.159 | 14 |
| | | 2 | 2.166 | 2.179 | 13 |
| TT-4-57 | 5:1 | 1 | 2.169 | 2.199 | 30 |
| | | 1 | 2.117 | 2.146 | 29 |
| | | 2 | 2.143 | 2.161 | 18 |
| | | 2 | 2.121 | 2.137 | 16 |
| | | 2 | 2.164 | 2.181 | 17 |

TABLE III-continued

Carbon/Carbon Composites Coated with
"Hf(OiPr)$_2$(OCH$_2$CH=CH$_2$)$_2$"/[CH$_3$Si(H)O]$_n$ Reaction Mixtures

| Coating Solution No. | Wt. ratio of polysiloxane: Hf alkoxide | Batch No. | Composite wt. prior to coats (g) | Composite wt. after 3 coating runs (g) | Weight gain (mg) |
|---|---|---|---|---|---|
| TT-4-56 | 4:1 | 1 | 2.161 | 2.209 | 48 |
|  |  | 1 | 2.128 | 2.170 | 42 |
|  |  | 2 | 2.135 | 2.150 | 15 |
|  |  | 2 | 2.127 | 2.143 | 16 |
|  |  | 2 | 2.128 | 2.139 | 11 |
| TT-4-58 | 2:1 | 1 | 2.103 | 2.157 | 44 |
|  |  | 1 | 2.162 | 2.198 | 36 |
|  |  | 1 | 2.137 | 2.187 | 50 |
|  |  | 2 | 2.143 | 2.160 | 18 |
|  |  | 2 | 2.121 | 2.137 | 16 |
|  |  | 2 | 2.164 | 2.181 | 17 |

TABLE IV

Carbon/Carbon Composites Coated with "Zr(OiPr)$_2$(OCH$_2$CH=CH$_2$)$_2$"/
[CH$_3$Si(H)O]$_n$ Reaction Mixtures

| Coating Solution No. | Wt. ratio of polysiloxane: Zr alkoxide | Batch No. | Composite wt. prior to coats (g) | Composite wt. after 3 coating runs (g) | Weight gain (mg) |
|---|---|---|---|---|---|
| TT-4-61 | 8:1 | 1 | 2.165 | 2.206 | 41 |
|  |  | 1 | 2.125 | 2.168 | 43 |
|  |  | 1 | 2.141 | 2.190 | 43 |
|  |  | 2 | 2.158 | 2.174 | 16 |
|  |  | 2 | 2.138 | 2.150 | 12 |
|  | 4:1 | 1 | 2.136 | 2.169 | 33 |
|  |  | 1 | 2.144 | 2.172 | 28 |
|  |  | 1 | 2.139 | 2.179 | 40 |
|  |  | 2 | 2.189 | 2.213 | 24 |
|  |  | 2 | 2.162 | 2.188 | 26 |
|  | 2:1 | 1 | 2.165 | 2.183 | 18 |
|  |  | 1 | 2.156 | 2.179 | 23 |
|  |  | 1 | 2.164 | 2.183 | 19 |
|  |  | 2 | 2.161 | 2.176 | 15 |
|  |  | 2 | 2.160 | 2.173 | 13 |

This invention has been described in detail with reference to the preferred embodiments thereof. However, it will be appreciated that those skilled in the art upon consideration of this disclosure may make modifications and improvements within the scope and spirit of the invention as described in the claims.

We claim:

1. A hybrid polymer prepared by a method comprising:
   (a) mixing an organosilicon polymer having a plurality of Si—H functional groups with a sufficient quantity of a M-alkenoxide to undergo a hydrosilylation reaction, wherein M is a metal or metalloid atom and the M-alkenoxide comprises at least one alkenoxy substituent bound to M; and
   (b) initiating the hydrosilylation reaction to form the hybrid polymer.

2. The hybrid polymer of claim 1, wherein the method further comprises adding a catalyst to the mixture of step (a).

3. The hybrid polymer of claim 1, wherein the hydrosilylation reaction is initiated by ultraviolet irradiation.

4. The hybrid polymer of claim 1, wherein the hydrosilylation reaction is initiated by heating the mixture.

5. The hybrid polymer of claims 3 or 4, wherein the method further comprises adding a catalyst to the mixture of step (a).

6. The hybrid polymer of claim 5 wherein the catalyst is selected from the group consisting of transition metal catalysts and free radical catalysts.

7. The hybrid polymer of claim 6 wherein the free radical catalyst is selected from the group consisting of peroxides and azo compounds.

8. The hybrid polymer of claim 7 wherein the peroxide is an organic peroxide.

9. The hybrid polymer of claim 6 wherein the transition metal catalyst is H$_2$PtCl$_6$.6H$_2$O.

10. The hybrid polymer of claim 6 wherein the organosilicon polymer having a plurality of Si—H functional units is an organic polysilane having a plurality of si—H functional units.

11. The hybrid polymer of claim 10 wherein M is selected from the group consisting of Al, As, B, Be, Bi, Cd, Ce, Co, Cr, Cu, Dy, Er, Eu, Fe, Ga, Gd, Ge, Hf, Ho, In, La, Mo, Mn, Nb, Nd, Pb, Pr, Sb, Sc, Sm, Sn, Ta, Tb, Th, Ti, Tl, Tm, U, V, W, Y, Yb, Zn and Zr.

12. The hybrid polymer of claim 11 wherein M is a transition metal.

13. The hybrid polymer of claim 1 wherein the organosilicon polymer having a plurality of Si—H functional groups is a polymer having a plurality of repeat units selected from the group consisting of repeat units of the formula:

$$[(RSiH)_x(RSi)_y]_n, \qquad (I)$$
$$[RSi(H)(Org)_q]_n, \qquad (II)$$
$$[RSi(H)O]_n, \qquad (III)$$

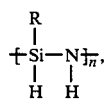

(IV)

-continued

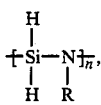 (V)

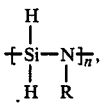 (VI)

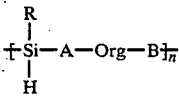 (VII)

and mixtures thereof,
where R is H, a substituted or unsubstituted lower alkyl group of 1 to about 6 carbon atoms, a substituted or unsubstituted cycloalkyl group of 3 to about 10 carbon atoms or a substituted or unsubstituted lower aryl group of 6 to about 10 carbon atoms, Org is a difunctional alkylene, alkenylene or alkynylene group, A=B=O, A=B=NR or A=O and B=NH, q is 1 or greater, x+y=1, and n is an integer greater than 1.

14. The hybrid polymer of claim 10 wherein the organosilicon polymer having a plurality of Si—H functional groups is selected from the group consisting of
   (a) organopolysilanes having a plurality of repeat units of the formula:

$[(RSiH)_x(RSi)_y]_n$ (I), (b) polycarbosilanes having a plurality of repeat units of the forumla:

$[RSi(H)(Org)_q]_n$ (II), (c) polysiloxanes having a plurality of repeat units of the formula:

$[RSi(H)O]_n$ (III), and
   (d) polysilanes containing a mixture of repeat units of the formulas I, II, and III,
   where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms, Org is a difunctional alkylene, alkenylene or alkynylene group, q is 1 or greater, x+y=1, and n is an integer greater than 1.

15. The hybrid polymer of claim 11 wherein the organic polysilane having a plurality of Si—H functional groups is selected from the group consisting of
   (a) organopolysilanes having a plurality of repeat units of the formula:

$[(RSiH)_x(RSi)_y]_n$ (I), (b) polycarbosilanes having a plurality of repeat units of the forumla:

$[RSi(H)(Org)_q]_n$ (II), (c) polysiloxanes having a plurality of repeat units of the formula:

$[RSi(H)O]_n$ (III), and
   (d) polysilanes containing a mixture of repeat units of the formulas I, II, and III,
   where R is H, a substituted or unsubstituted lower alkyl group of 1 to about 6 carbon atoms, a substituted or unsubstituted cycloalkyl group of 3 to about 10 carbon atoms, or a substituted or unsubstituted lower aryl group of 6 to about 10 carbon atoms, Org is a difunctional alkylene, alkenylene or alkynylene group, q is 1 or greater, x+y=1, and n is an integer greater than 1.

16. The hybrid polymer of claim 15 wherein M is selected from the group cosisting of Cr, Hf, Mo, Nb, Ta, Ti, V, W and Zr.

17. The hybrid polymer of claim 15 wherein the organopolysilane contains at least about 25 mole % of repeat units of the formula $[(RSiH)_x(RSi)_y]_n$, the polycarbosilane contains at least about 25 mole % of repeat units of the formula $[RSi(H)(Org)_q]_n$ and the polysiloxane contains at least about 25 mole % of repeat units of the formula $[RSi(H)O]_n$.

18. The hybrid polymer of claim 16 wherein the organopolysilane contains at least about 35 mole % of repeat units of the formula $[(RSiH)_x(RSi)_y]_n$, the polycarbosilane contains at least about 35 mole % of repeat units of the formula $[RSi(H)Org)_q]_n$ and the polysiloxane contains at least about 35 mole % of repeat units of the formula $[RSi(H)O]_n$.

19. The hybrid polymer of claim 18 where R is the lower alkyl group.

20. The hybrid polymer of claim 19 where R is $CH_3$.

21. The hybrid polymer of claim 20 where the organopolysilane contains at least about 50 mole % of repeat units of the formula $[(RSiH)_x(RSi)_y]_n$, the polycarbosilane contains at least about 50 mole % of repeat units of the formula $[RSi(H)Org)_q]_n$ and the polysiloxane contains at least about 50 mole % of repeat units of the formula $[RSi(H)O]_n$.

22. The hybrid polymer of claim 18 where the organopolysilane has the formula $[(RSiH)_x]_n$ where x=1 and y=0.

23. A method of protecting carbon/carbon composites from oxidation at high temperatures which comprises:
   Coating the carbon/carbon composite with a hybrid polymer prepared by a method comprising:
   (a) mixing an organosilicon polymer having a plurality of Si—H functional groups with a sufficient quantity of a $M^1$-alkenoxide to undergo a hydrosilylation reaction, wherein $M^1$ is a metal, metalloid or silicon atom and the $M^1$-alkenoxide comprises at least one alkenoxy substituent bound to $M^1$; and
   (b) initiating the hydrosilylation reaction to form the hybrid polymer.

24. The hybrid polymer of claim 1 wherein the M-alkenoxide contains at least two unsaturated groups.

25. The hybrid polymer of claim 6 wherein the M-alkenoxide has the formula $(R^1O)_3M\equiv M(OR^1)_3$ where $R^1$ is a substituted or unsubstituted alkenyl group having 2 to about 10 carbon atoms and M is Mo or W.

26. A hybrid polymer prepared by a method comprising:

(a) mixing an organic polysilane having a plurality of Si—H functional units with a sufficient quantity of a $M^1$-alkenoxide to undergo a hydrosilylation reaction wherein the $M^1$-alkenoxide has the formula $M^1(OR^1)_m$ wherein $R^1$ is a substituted or unsubstituted alkenyl group having 2 to about 10 carbon atoms, $M^1$ is selected from the group consisting of Al, As, B, Be, Bi, Cd, Ce, Co, Cr, Cu, Dy, Er, Eu, Fe, Ga, Gd, Ge, Hf, Ho, In, La, Mo, Mn, Nb, Nd, Pb, Pr, Sb, Sc, Si, Sm, Sn, Ta, Tb, Th, Ti, Tl, Tm, U, V, W, Y, Yb, Zn and Zr and m is an integer from 1 to 6; and (b) initiating the hydrosilylation reaction either by heating the mixture or by ultraviolet irradiation of the mixture of step(a), wherein a catalyst is added to the mixture of step (a), and the catalyst is selected from the group of transition metal catalysts and free radical catalysts.

27. The hybrid polymer of claim 26 wherein m is 2.

* * * * *